June 19, 1923.
C. A. DONALDSON
STEERING WHEEL
Filed April 18, 1922
1,459,090
2 Sheets-Sheet 1
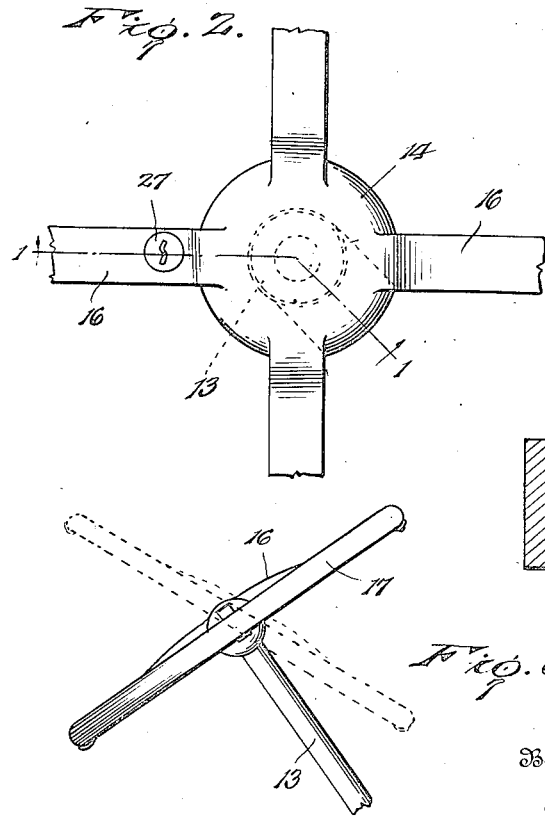
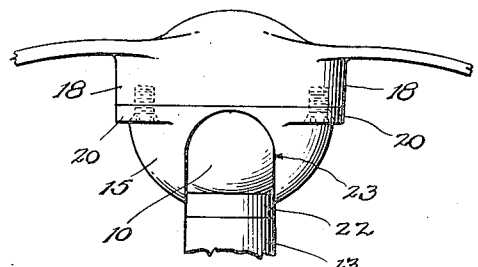
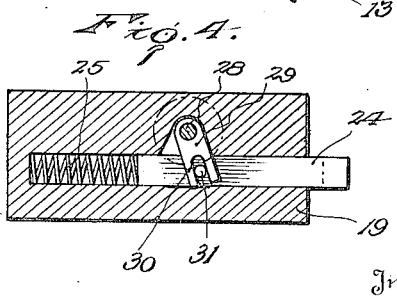
Inventor
C. A. Donaldson.
By
Lacey & Lacey, Attorneys

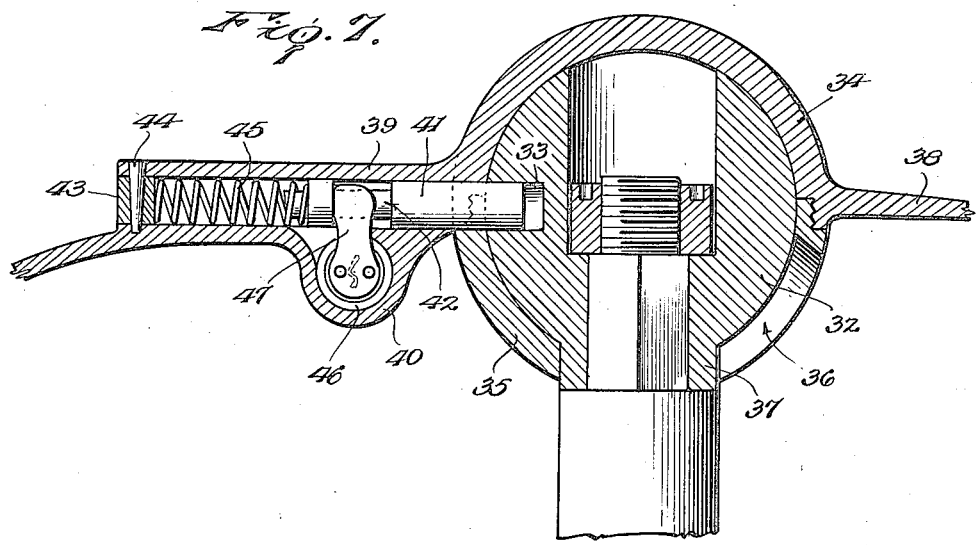
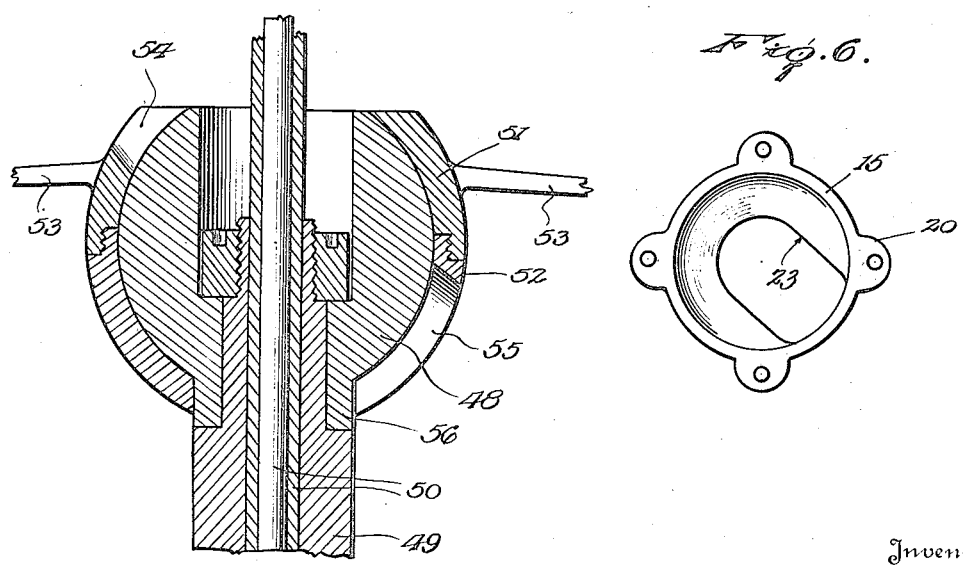

Patented June 19, 1923.

1,459,090

UNITED STATES PATENT OFFICE.

CHARLES ARTHUR DONALDSON, OF SAN ANTONIO, TEXAS.

STEERING WHEEL.

Application filed April 18, 1922. Serial No. 554,993.

*To all whom it may concern:*

Be it known that I, CHARLES ARTHUR DONALDSON, a citizen of the United States, residing at San Antonio, in the county of Bexar and State of Texas, have invented certain new and useful Improvements in Steering Wheels, of which the following is a specification.

This invention relates to an improved steering wheel for motor vehicles and seeks, as one of its principal objects, to provide a wheel which may be freed from the steering post to turn independently thereof so as to thereby prevent steering of the vehicle.

The invention has as a further object to provide a steering wheel which, when freed from the steering post, may be tilted so as to provide additional room or clearance at the rear of the wheel.

And a still further object of the invention is to provide a wheel which may be readily employed in connection with conventional steering posts.

Other and incidental objects will appear hereinafter.

In the drawings:

Figure 1 is a sectional view through my improved steering wheel on the line 1—1 of Figure 2, looking in the direction of the arrows, Figure 2 is a fragmentary plan view of the wheel, Figure 3 is a fragmentary elevation, Figure 4 is a detail sectional view through the lock of the wheel, Figure 5 is a fragmentary elevation showing the manner in which the wheel may be tilted, Figure 6 is a plan view of the bottom section of the socket of the wheel, Figure 7 is an enlarged sectional view showing a modification of the invention, and Figure 8 is a fragmentary sectional view showing a still further modification.

Referring now more particularly to the drawings, I employ a spherical head or ball 10 having a recess 11 therein from which extends a squared opening 12 adapted to accommodate the squared upper terminal of a steering post, as conventionally illustrated at 13, and threaded upon the usual stud at the upper end of said post is a nut 13' securing the head upon the steering post, said nut being accommodated in the recess 11. Snugly fitting the head is a socket comprising a hemispherical section 14 and a mating hemispherical section 15 and integrally formed on the section 14 are spokes 16 to which is secured a rim 17. As shown in Figure 2, the spokes are preferably four in number and formed beneath the inner ends of three of the spokes are bosses 18 while beneath the inner end of the fourth spoke is formed an elongated boss 19. The section 15 of the socket is, as shown in detail in Figure 6, provided with ears 20 which seat flat against said bosess and extending through the ears are screws or other suitable fastening devices 21 threaded into the bosses for connecting the sections of the socket. Formed on the head 10 at its lower side is a cylindrical neck or flange 22 surrounding the opening 12 in said head and formed in the socket section 15 is a slot 23 freely accommodating said neck. Thus the socket may freely turn upon the head. Slidably mounted in the boss 19 is a radially disposed bolt 24 behind which is arranged a spring 25 pressing the bolt radially inward to normally engage in an opening 26 in the head and mounted upon the adjacent spoke of the wheel is a lock 27 exposed at the upper side of said spoke. This lock may be of any appropriate design but is preferably provided with a spindle 28 and mounted upon said spindle is, as shown in detail in Figure 4, an arm 29 formed at its free end with a notch 30. Upstanding from the bolt is a pin 31 accommodated in said notch. Thus, as will be seen, the lock may be operated for retracting the bolt against the tension of the spring 25 and securing the bolt retracted, thereby leaving the wheel free to turn on the steering post. Under such condition, the vehicle cannot, of course, be guided so that possibility of theft of the vehicle will be minimized. Furthermore, due to the presence of the slot 23 in the socket section 15 of the wheel, the wheel may, when the bolt is thus retracted, be tilted upwardly at its rear side, as shown in dotted lines in Figure 5, to provide additional clearance between the wheel and the driver's seat. Upon release of the bolt, said bolt will press against the head 10 so that the wheel may then be rotated until the bolt drops into the opening 26 of the head, when the wheel may be operated for turning the steering post in the usual manner.

In Figure 7 of the drawings, I have illustrated a slight modification of the invention wherein a spherical head or ball 32 is employed. This head is adapted to be mounted upon a steering post in a manner similar to the head 10 and is provided at one side thereof with an opening 33. Fitting the head is a socket comprising mating sections 34 and 35 which, instead of being secured together by screws, as in the preferred construction, are threaded into engagement with each other, the section 35 being provided with a slot 36 accommodating a neck or flange 37 at the lower side of the head. Projecting from the socket section 34 is a plurality of spokes 38, one of which is formed at its inner end with a boss 39 lying at the upper side of the spoke while at the lower side of said spoke is a boss 40. The boss 39 is provided with an opening therein which extends through the section 34 and slidable in said opening is a bolt 41 reduced near its outer end to define a slot 42. Closing the outer end of the opening through the boss is a plug 43 secured by a tapered pin 44 and bearing between said plug and the outer terminal of the bolt is a spring 45 normally projecting the bolt to engage in the opening 33 of the head locking the wheel upon the head. Mounted in the boss 40 is an appropriate lock 46 to the cylinder of which is secured an arm 47 engaging in the slot 42 of the bolt. Accordingly, the lock may, as will be appreciated, be operated for retracting the bolt and securing the bolt retracted when the wheel will then be free to turn upon the head while, due to the presence of the slot 36 in the socket section 35, the wheel may also be tilted as in the preferred construction.

In Figure 8 of the drawings, I have shown a still further modification of the invention adapted for use in any instance where a quadrant is mounted at the upper end of the steering post. A spherical head or ball 48 is employed, as in the preferred construction, and is secured upon the steering post in a similar manner, the steering post being conventionally illustrated at 49. Extending through the steering post are the usual spark and throttle rods 50 which project through the head. At their upper ends, these rods carry the customary control levers which are arranged to cooperate with the quadrant, the levers and the quadrant not being shown. Fitting the head is a socket comprising an upper ring or section 51 and a mating lower ring or section 52 threaded upon the former ring. Extending from the ring 51 are spokes 53 and formed in said ring at its upper edge is a slot 54 to accommodate the rods 50. Formed in the ring 52 is a slot 55 to accommodate the neck or flange 56 at the lower side of the head so that, as will be seen, the socket may, when released from the head, be rocked thereon to permit tilting of the steering wheel. Locking mechanism similar to that shown in connection with the prior modification is employed in conjunction with one of the spokes for normally securing the socket stationary but it has been deemed unnecessary to repeat the showing of such mechanism.

Having thus described the invention, what is claimed as new is:

1. In a steering wheel, the combination of a spherically shaped head adapted to be secured upon a steering post, a socket rotatably fitting the head and formed of an upper section and a mating lower hemi-spherical section slotted to accommodate the steering post whereby the socket may be rocked upon the head, spokes radiating from the upper section and formed at their inner ends with bosses reinforcing the margin of such section, a rim carried by the spokes, radial ears formed on the margin of the lower section reinforcing such section and mating with said bosses, and fastening devices extending through said ears to engage the bosses detachably connecting the sections.

2. The combination with a steering post provided at its upper end with a reduced squared portion defining an annular shoulder at the base thereof, of a spherically shaped head apertured to fit the squared portion of the post and provided with a radial neck abutting said shoulder, means detachably securing the head upon the squared portion of the post, a socket rotatably fitting the head and formed of an upper section and a lower hemi-spherical section slotted to accommodate said neck whereby the socket may be rocked upon the head, the socket normally covering the entire spherical surface of the head except at said slot, spokes radiating from the socket, a rim carried by the spokes, one of said spokes being formed at its inner end with a depending boss, and locking mechanism mounted in said boss and including a bolt for connecting the socket and head to turn in unison, said mechanism being operable for positively holding the bolt retracted rendering the wheel inactive.

In testimony whereof I affix my signature.

CHARLES ARTHUR DONALDSON.